United States Patent [19]

Carrera

[11] 4,448,625
[45] May 15, 1984

[54] METHOD OF MAKING A COMPOSITE PLASTIC MAT

[75] Inventor: Armando Carrera, Wood Dale, Ill.

[73] Assignee: Tenex Corporation, Elk Grove, Ill.

[21] Appl. No.: 307,651

[22] Filed: Oct. 2, 1981

[51] Int. Cl.³ ............................................. B32B 31/00
[52] U.S. Cl. ........................... 156/243; 156/244.11;
  156/244.18; 156/244.19; 156/244.27; 156/268;
  156/270; 156/271; 156/298; 156/322
[58] Field of Search .......... 156/204, 227, 243, 244.11,
  156/244.12, 244.18, 244.19, 244.23, 244.24,
  244.25, 244.27, 248, 268, 269, 257, 270, 271,
  298, 303.1, 304.1, 304.3, 322; 428/53, 58, 67,
  167, 170, 173

[56] References Cited

U.S. PATENT DOCUMENTS

| 3,650,872 | 3/1972 | McKiernan | 156/304.3 |
| 3,741,843 | 6/1973 | Louis | 156/304.3 |
| 3,843,438 | 10/1974 | Gabriel | 156/303.1 |
| 3,943,022 | 3/1976 | Susnjara | 156/268 |
| 3,962,016 | 6/1976 | Alfler et al. | 156/304.3 |
| 4,318,764 | 3/1982 | VanManen | 156/244.12 |

FOREIGN PATENT DOCUMENTS 52-17005  8/1977  Japan .................. 156/303.1

Primary Examiner—Caleb Weston
Attorney, Agent, or Firm—Hosier, Niro & Daleiden

[57] ABSTRACT

An improved floor mat which may be readily folded 180° upon itself. The mat includes a semi-rigid plastic surface with a transversely extending plastic strip laminated into its undersurface. The plastic strip is formed of material relatively more flexible than the overlying mat material. The mat is provided with a transverse slit overlying the laminated plastic strip which preferably extends downwardly to the upper surface of the plastic strip whereby the floor mat may be readily folded along the the flexible plastic strip.

10 Claims, 2 Drawing Figures

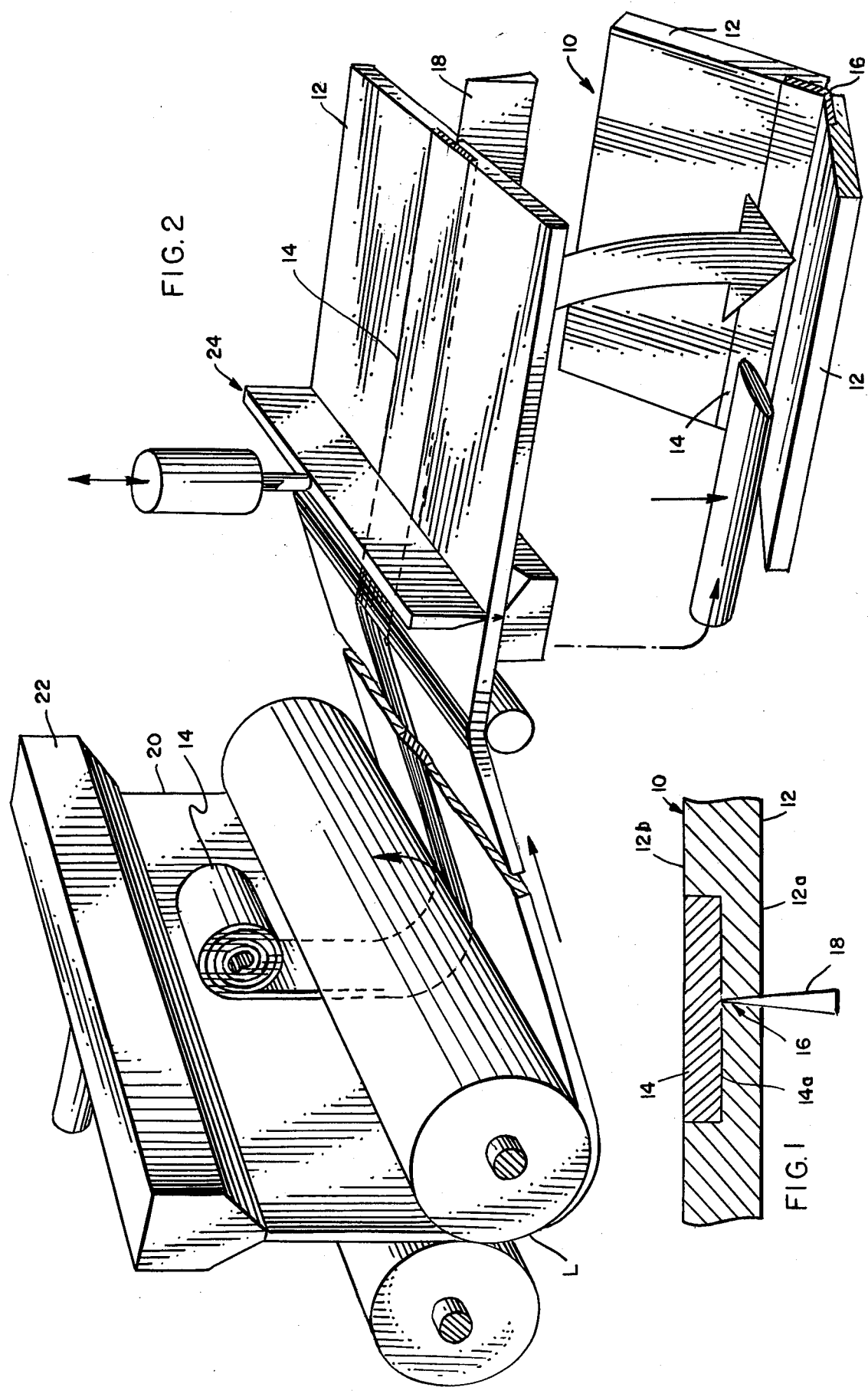

METHOD OF MAKING A COMPOSITE PLASTIC MAT

BACKGROUND OF THE INVENTION

This invention relates generally to plastic floor mats and the like, and the method of forming same. More specifically, this invention relates to a plastic chair mat which may be so formed as to readily fold substantially 180° upon itself for purposes primarily of storage and shipping, etc.

An elongated mat of plastic material, such as vinyl, is a well known product for use in homes and certain commercial applications as a protective overlay for carpeting. In particular, such mats are used in association with chairs to protect the carpet against concentrated wear and tear associated with the chair.

Over the years various improvements have been incorporated into the floor mats as considered above. For example, cleats may be formed on the underside of the mats to provide engagement with the underlying carpet to prevent sliding. Additionally, various upper surface formations may be provided on the mat in the nature of embossments of varying configurations. For example, U.S. Pat. No. 3,551,544-Hlinka, assigned to the assignee of the present invention, discloses a process for forming cleats and embossed upper surfaces as considered above.

One drawback to prior art mats which has been recognized, however, resides in the fact that they cannot be readily folded 180° for purposes of shipping and storage for example. Since the mats are formed of a semi-rigid plastic material and cannot be smoothly folded as opposed to being folded with a resulting bulge developing about the line of folding as is the case with currently available mats, it becomes readily apparent that it can be cumbersome to handle the mats.

SUMMARY OF THE INVENTION

Accordingly, one object of the present invention is to provide a new and improved floor mat which may be readily folded upon itself so that a bulge does not appear about the line of folding.

A principal object of the present invention is to provide an improved chair mat which may be folded in half for purposes of storage and shipping wherein each half lies smoothly against one another.

In summary, the present invention provides a floor mat formed of semi-rigid plastic material which may, but does not have to, include cleats or other carpet engaging means on its lower surface and/or various types of embossed designs on its upper surface. The mat is formed to include an integrally laminated plastic strip extending transversely across the undersurface of the mat. The plastic strip is relatively more flexible than the basic mat material to provide a hinge about which the mat may be folded. Preferably the mat includes a slit extending through its upper surface to the plastic strip which facilitates folding of the mat and the avoidance of any tendency to create a bulge at the fold line along the plastic strip.

The foregoing and other objects, advantages, and characterizing features of the present invention will become clearly apparent from the ensuing detailed description of an illustrative embodiment thereof, taken together with the accompanying drawings wherein like referenced characters denote like parts throughout the various views.

BRIEF DESCRIPTION OF THE DRAWINGS

FIG. 1 is a fragmentary, longitudinal view in section illustrating the composite floor mat having a transversely extending flexible strip laminated into one of its surfaces; and FIG. 2 is a perspective view of a forming station including a pair of cylindrical roll formers for laminating a relatively flexible plastic strip into a molten vinyl web as both are simultaneously fed to and advanced through the pair of cylindrical roll formers.

DETAILED DESCRIPTION OF A PREFERRED EMBODIMENT

Referring now in detail to FIG. 1 of the drawings, there is shown a segment of a vinyl plastic floor mat 10 in inverted form that has been constructed in accordance with the present invention. The mat 10 includes an elongated web 12 which may have decorative embossing on its upper surface 12a and may be provided in some instances with one of a variety of carpet grippers extending from its lower surface 12b for penetrating into an underlying carpet for example. For the sake of similicity, the decorative embossing and carpet grippers referred to have not been shown since such features are well known to those skilled in the art and are not necessary for purposes of the present invention.

In the mat segment shown in FIG. 1, 12a represents the normal wear surface of the mat while 12b represents the surface of the mat which would rest on an underlying floor surface. The present invention is directed to the lamination of a plastic strip means 14 preferably into the floor engaging surface 12b of web 12. Preferably, the adjacent outer exposed surfaces of strip 14 and surface 12b are coplanar i.e. the strip 14 is laminated in such a manner as to be flush with the floor engaging surface of the mat.

In addition, a slit 16 is provided in web 12 to extend into the web surface 12a opposite from strip 14. The disposition of slit 16 is schematically represented by the placement of knife edge tool 18 which will be more fully described with respect to the process for forming the mat of the present invention. Slit 16 extends into web surface 12a preferably through to the adjacent surface 14a of the plastic strip. Slit 16 accordingly is disposed generally opposite and parallel to strip 14.

As illustrated in the lower right hand portion of FIG. 2, the floor mat 10, which is specifically for use as a chair mat, may be folded longitudinally along strip 14 at a fold line corresponding to the bottom of slit 16 whereby slit 16 tends to open as illustrated in FIG. 2. In the particular embodiment shown, the mat 10 can thereby be folded in half.

The vinyl plastic used to fabricate the basic floor mat web 12 is semi-rigid and has a durometer rating on the order of 80–95 on a Rockwell C scale for example. Such a plastic provides a durable wear surface 12a for the mat during normal use. In an unfolded disposition slit 16 is barely noticeable and does not present any disadvantage with respect to normal use of the mat. Plastic strip 14 is fabricated from a relatively flexible plastic, relative to web 12, including a durometer rating on the order 50–70 on a Rockwell A scale for example. Additionally, it has been found preferable to laminate a strip 14 having a thickness of approximately one-half the total thickness of web 12 (i.e. the thickness of web 12 at a point removed from strip 14).

Turning to the process for forming the composite web structure described above, reference will be made to the prospective view illustrated in FIG. 2. A web-like supply 20 of vinyl in molten condition is provided by extruding means 22. The molten vinyl web 20 is fed to a forming station comprising a pair of cylindrical roll formers 22. In addition, the plastic strip means 14 is, simultaneously with molten web 20, fed into the bite of roll formers 22. The strip 14 is in a solidified state when it is fed into the roll formers. The roll formers pressure the molten web 20 and plastic strip 14 into an elongated composite web as clearly illustrated in FIG. 2 and as further illustrated in fragmentary cross section in FIG. 1. Appropriate cooling means may be incorporated, as well known to those skilled in the art, for purpose of solidifying the molten web 20. It has been found preferable to preheat the plastic strip 14 prior to feeding the same into the roll formers to enhance the lamination thereof to the web 20. In this regard it has been found preferable to preheat the plastic strip to a temperature just below the molten temperature thereof.

As the formed composite web leaves the forming station, it may be cut into predetermined lengths at a cutting station as shown at 24 for example. In addition, as referred to above, a knife or a slitting means 18 may be appropriately positioned to impart slit 16 in the resulting mat. It is to be understood that the sequence of cutting means 24 and knife means 18 could be reversed, the arrangement in FIG. 2 being for illustrative purposes only. In either case, the resulting floor mat is illustrated in the lower right hand portion of FIG. 2 in a partially folded disposition for purposes of illustration.

From the foregoing, it is apparent that the objects of the present invention have been fully accomplished. As a result of this invention, an improved floor mat is provided for substantially avoiding storage and shipping problems associated with prior art floor mats which could not be readily folded in half.

Having thus described and illustrated a preferred embodiment of my invention, it will be understood that such description and illustration is by way of example only and that such modifications and changes as may suggest themselves to those skilled in the art are intended to fall within the scope of the present invention as limited only by the appended claims.

What is claimed is:

1. A process for forming a floor mat and the like including an elongated web means of flexible plastic material and a plastic strip means laminated into one side of said web means, said plastic strip means being relatively more flexible than said web means whereby folding of said mat along the length of said strip means is facilitated, said process comprising the following steps:

feeding and advancing a web-like supply of vinyl in molten condition to and through a forming station,
   feeding and advancing, simultaneously with said web-like supply of vinyl, a plastic strip means to and through said forming station,
   pressuring said web-like supply of molten vinyl and said plastic strip means at said forming station into an elongated composite web wherein said forming station comprises cylindrical formers which calendar the thickness of the resulting said composite web so that said plastic strip means becomes laminated in said web-like supply of molten vinyl with one side of said plastic strip means forming a portion of the resulting side of said composite web, and with the thickness of said composite web being greater than the thickness of said plastic strip means, including the step of slitting the side of said composite web opposite from said plastic strip means along a line generally opposite and parallel to said strip means substantially through to said plastic strip means.

2. The process as set forth in claim 1 including the step of cutting said composite web into selected lengths.

3. The process as set forth in claim 1 wherein said web-like supply of vinyl in molten condition normally comprises semi-rigid plastic material having a durometer rating on the order of 80-95 on a Rockwell C scale and said strip means material comprises a relatively flexible plastic having a durometer rating on the order of 50-70 on a Rockwell A scale.

4. The process as set forth in claim 1 wherein the step of slitting the side of said composite web comprises slitting said side of said composite web substantially through to the adjacent surface of said strip means.

5. The process as set forth in claim 1 wherein the thickness of said strip means is approximately one-half the thickness of said composite web.

6. The process as set forth in claim 1 including the step of pre-heating said plastic strip means to a temperature just below the molten temperature thereof to enhance the lamination of said plastic strip means to said web-like supply of vinyl in molten form.

7. The process as set forth in claim 6 including the step of cutting said composite web into selected lengths.

8. The process as set forth in claim 7 wherein said web-like supply of vinyl in molten condition normally comprises semi-rigid plastic material having a durometer rating on the order of 80-95 on a Rockwell C scale and said strip means material comprises a relatively flexible plastic having a durometer rating on the order of 50-70 on a Rockwell A scale.

9. The process as set forth in claim 8 wherein the step of slitting the side of said composite web comprises slitting said side of said composite web substantially through to the adjacent surface of said strip means.

10. The process as set forth in claim 9 wherein the thickness of said strip means is approximately ½ the thickness of said composite web.

* * * * *